US012632697B1

(12) United States Patent
Shrivastava et al.

(10) Patent No.: US 12,632,697 B1
(45) Date of Patent: May 19, 2026

(54) METHOD AND SYSTEM TO CONFIGURE A NEURAL PROCESSING UNIT

(71) Applicant: Marvell Asia Pte Ltd, Singapore (SG)

(72) Inventors: Saurabh Shrivastava, Saratoga, CA (US); Nidhi Patel, Fremont, CA (US); Geethanjali Rajegowda, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 570 days.

(21) Appl. No.: 18/203,415

(22) Filed: May 30, 2023

Related U.S. Application Data

(60) Provisional application No. 63/425,912, filed on Nov. 16, 2022.

(51) Int. Cl.
G06N 3/04 (2023.01)
(52) U.S. Cl.
CPC ...................................... G06N 3/04 (2013.01)
(58) Field of Classification Search
CPC ....................................................... G06N 3/04
See application file for complete search history.

(56) References Cited

U.S. PATENT DOCUMENTS

| | | | | |
|---|---|---|---|---|
| 11,556,762 B2 * | 1/2023 | Fowers | ................. | G06N 3/063 |
| 12,040,040 B2 * | 7/2024 | Kim | ....................... | G11C 29/44 |
| 12,166,688 B2 * | 12/2024 | Jain | ..................... | H04L 41/5019 |
| 12,216,922 B2 * | 2/2025 | Liljestrand | ............ | G06F 3/0655 |
| 12,461,781 B2 * | 11/2025 | Krishnan | ............... | G06N 3/098 |
| 2021/0271960 A1 * | 9/2021 | Raha | ...................... | G06F 9/3001 |
| 2021/0325861 A1 * | 10/2021 | Hou | ....................... | G06N 20/00 |
| 2023/0177839 A1 * | 6/2023 | Bajpayee | .............. | G06F 18/213 |
| 2024/0028878 A1 * | 1/2024 | Yu | ........................... | G06N 3/042 |

* cited by examiner

*Primary Examiner* — Viral S Lakhia

(57) ABSTRACT

A method includes receiving one or more configuration parameters associated with a neural processing unit (NPU), wherein the one or more configuration parameters defines a number of processing tiles within the NPU, and wherein a processing tile includes a processing element of a first type configured to perform a dense operation, a processing element of a second type configured to perform a sparse operation, and an on-chip memory (OCM) associated therewith; and automatically generating the NPU based on the one or more configuration parameters and further based on a hardware descriptive language (HDL).

23 Claims, 8 Drawing Sheets

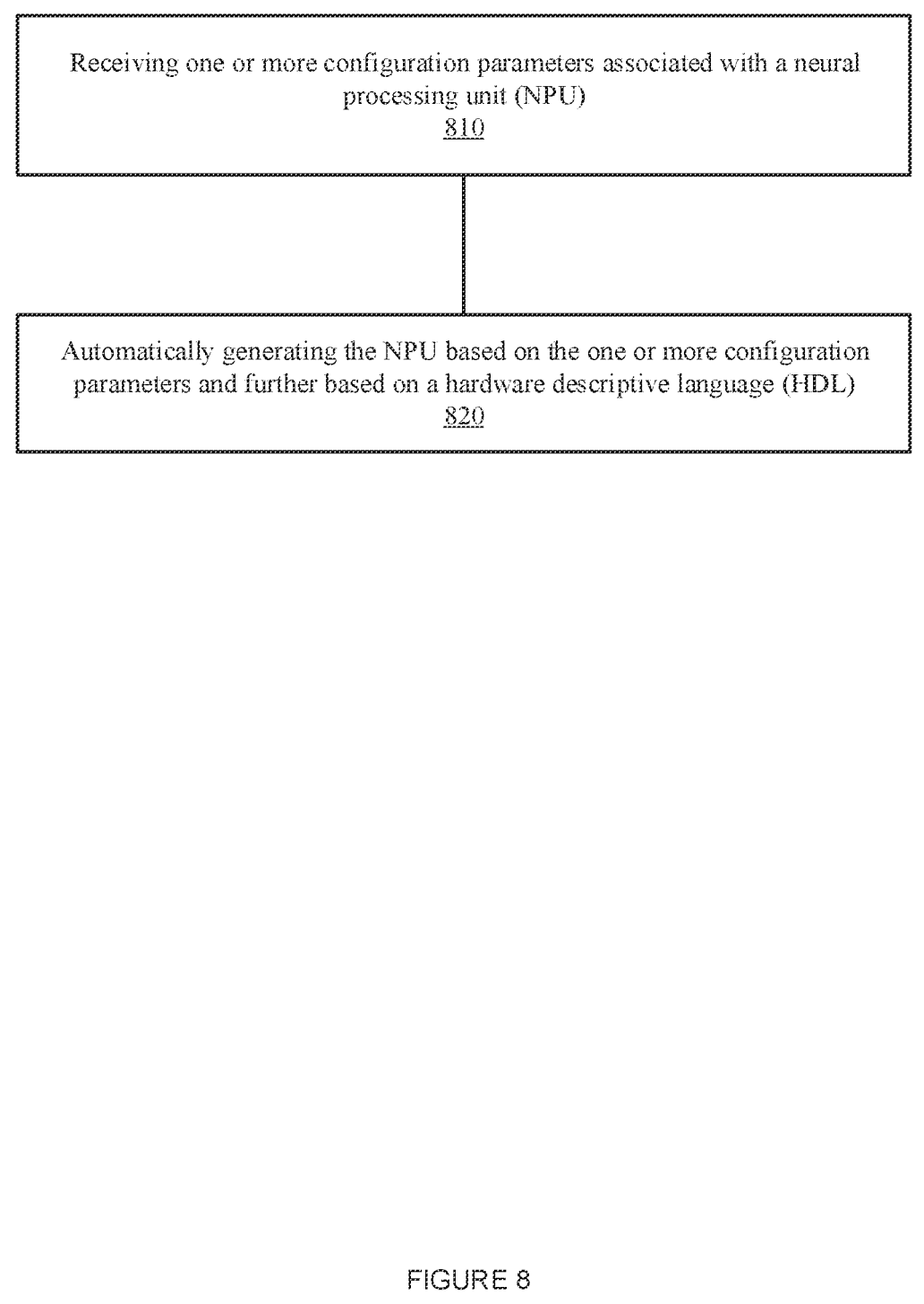

Receiving one or more configuration parameters associated with a neural
processing unit (NPU)
810

Automatically generating the NPU based on the one or more configuration
parameters and further based on a hardware descriptive language (HDL)
820

FIGURE 8

METHOD AND SYSTEM TO CONFIGURE A NEURAL PROCESSING UNIT

RELATED APPLICATION

This application is a nonprovisional application and claims the benefit and priority to a provisional application No. 63/425,912 filed on Nov. 16, 2022, which is incorporated herein by reference in its entirety.

BACKGROUND

Use and implementations of machine learning (ML) and artificial intelligence (AI) methods on electronic devices have become ubiquitous. The design of a hardware architecture of an electronic device, which can be but is not limited to a processor, a programmable logic, an application specific integrated circuit (ASIC), or a dedicated ML-specific hardware, often processes different ML models for different ML applications. Generally, the same architecture is used for processing data, e.g., inference, regardless of the application. In other words, conventionally the architectural design has taken a one-size-fits-all approach. For example, regardless of the application, the same number of processing unit, the same number of memory, the same number of routing elements, etc., have been used. Unfortunately, use of the same architecture regardless of the application results in waste of resources, e.g., use of more processing units than needed, use of larger memory than needed, use of more power than needed, etc.

In recognition of saving valuable resource and to take a more tailored approach, some have attempted to change the hardware architecture by scaling resources up/down as needed, depending on the application. Unfortunately, changing the hardware architecture and its design has not only been a manual process but it has proven to be a time consuming process. Moreover, scaling the hardware architecture up/down has conventionally been done by hardcoding the resources, e.g., processing units, memory accesses, etc., and by fixing their respective locations. One of the drawbacks associated with hardcoding resources and fixing their respective locations is that the approach is not only time consuming but also inflexible in that that it is not as readily modifiable and configurable.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 8 depicts a flowchart of an example of generating an NPU according to one aspect of the present embodiments.

DETAILED DESCRIPTION

Figure 1:
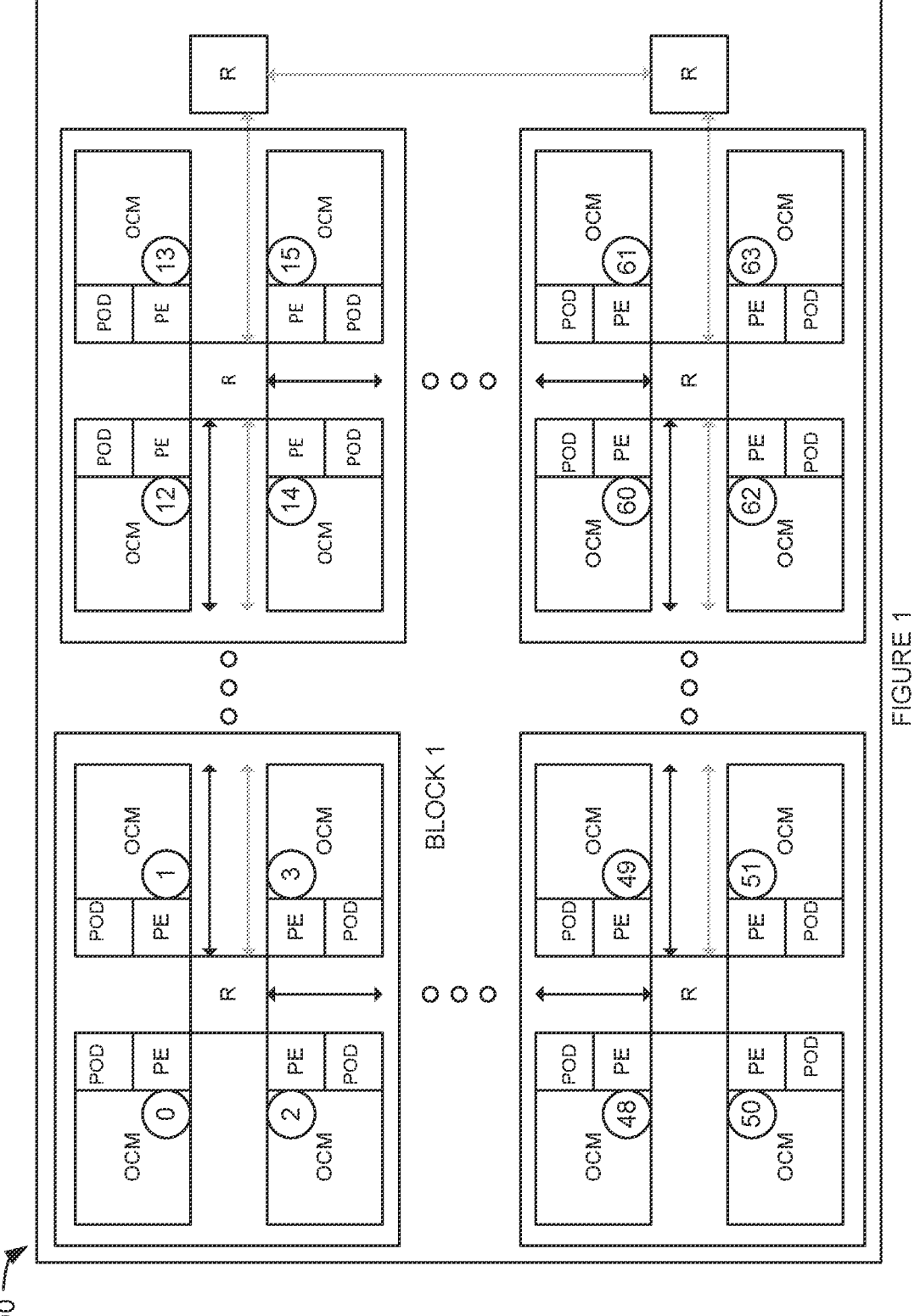
FIG. 1 depicts an example of a diagram of an ML hardware according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A need has arisen to configure neural processing units (NPUs) such that resources can be scaled up/down in an automated fashion, as desired, depending on the application. NPUs are generally microprocessors (or processors) that specialize in acceleration of machine learning (ML) algorithms. It is appreciated that one application may benefit from having 64 processing tiles (described in greater detail below) and 2 Double Data Rate (DDR) memory to on-chip memory (OCM) via direct memory access (DMA), i.e., DDR-OCM DMA or DoD block while in another application having 8 processing tiles with 1 DoD may be desired. The proposed embodiments enable configurations and views to be generated such that architectural design can be configured to scale up/down in an automated fashion quickly.

According to some embodiments, a combination of processing tiles (e.g., 4 processing tiles connected in a mesh router), DoDs, etc., may be generalized and used as basic building blocks of the architectural design that enables the scaling to be done in an efficient manner. In one nonlimiting example, the basic building blocks include 4 processing tiles (each processing tile includes a first processing unit (e.g., PE described in greater detail below), a second processing unit (e.g., POD described in greater detail below), and an OCM (e.g., SRAM)), where the processing tiles are connected to one another through a routing element, e.g., mesh router. It is appreciated that according to some embodiments, a configuration data (e.g., number of rows, number of columns, number of processing tiles, number of DoDs, etc.) received along with a templated hardware description language are used to automatically generate an NPU from a number of the basic building blocks (e.g., 1, 2, 3, 4, etc.). It is appreciated that the embodiments are described with respect to machine learning (ML) scheme for illustrative purposes only and should not be construed as limiting the scope of the embodiments.

For a non-limiting example, the ML hardware may include 64 processing tiles (each processing tile may further include a plurality of smaller processing elements that are described in the U.S. patent application Ser. No. 16/226,508, filed Dec. 19, 2018, now issued as the U.S. Pat. No. 11,086,633 that is incorporated herein by reference in its entirety). Each of those processing tiles is configured to receive a tensor data and an instruction (i.e., compiled SoftMax instructions, ArgMax instruction, TopK, GEMM, SUM, MUL, etc.). As such, multiple tensors may be operated on simultaneously, thereby reducing the processing time. For illustrative purposes, it is assumed that there are 64 processing tiles where each processing element is configured to process 64 elements. However, it is appreciated that any number of processing tiles may be used.

One example of an ML hardware architecture is described in the U.S. Pat. No. 11,086,633 and as further described in FIG. 1 below. The ML hardware architecture of FIG. 1 is highly efficient, flexible and optimized for high-efficiency ML computing while it reduces overhead and latencies. By providing hardware support to streamline data/instruction flow, the proposed ML hardware architecture improves system-level performance by significantly reducing the hardware overhead involved in moving data and/or instruction in existing computing architectures. The proposed ML hardware architecture works well with existing software frameworks and code and may be applied to a wide variety of ML algorithms and neural networks including, but not limited to, convolution neural network (CNN), recurrent neural network (RNN), gradient boosting machine (GBM), generative adversarial neural network, decision trees, random forest, support vector machine (SVM), clustering, Markov random field (MRF), etc.

In the example of FIG. 1, the ML-specific hardware 100 is a dedicated hardware, including one or more processors and/or OCM units storing the data and/or the set of low-level instructions compiled from the high-level code by the compiler to perform one or more ML operations, e.g., SoftMax operation, ArgMax operation, TopK operation, scatter-gather operation, etc. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks. It is appreciated that one or more components of the system may run on one or more computing units or devices (not shown) each with software instructions stored in a storage unit such as a non-volatile memory of the computing unit for practicing one or more processes. When the software instructions are executed, at least a subset of the software instructions are loaded into memory by one of the computing units, which becomes a special purposed one for practicing the processes. The processes may also be at least partially embodied in the computing units into which computer program code is loaded and/or executed, such that, the computing units become special purpose computing units for practicing the processes.

At runtime, the ML-specific hardware 100 is configured to retrieve the set of low-level instructions and/or data from the compiler and execute the set of low-level instructions to perform the one or more ML operations according to the set of low-level instructions. For a non-limiting example, the ML-specific hardware 100 can be, but is not limited to, an inference engine, which is configured to infer and identify a subject via an inference operation from data input according to the ML network model. FIG. 1 depicts a non-limiting example of an inference engine that includes a plurality of processing tiles, e.g., tiles 0, . . . , 63, arranged in a two-dimensional array of a plurality of rows and columns, e.g., 8 row by 8 columns. Each processing tile (e.g., tile 0) includes at least one OCM, a first type of processing unit (e.g., POD) for performing a first type of ML (e.g., dense)

operations, and a second type of processing unit (e.g., PE) for performing a second type of ML (e.g., sparse) operations. Both types of processing units can execute and be programmed by some of the plurality of low-level instructions received from the compiler. In some embodiments, a plurality of processing tiles forms a processing block, e.g., tiles 0-3 forms processing block 1, and the processing tiles within each processing block are coupled to one another via a routing element, e.g., tiles 0-3 are coupled to one another via routing element R to form processing block 1. It is appreciated that a processing block may also be referred to as compute brick. It is appreciated that forming a processing block that includes 4 processing tiles arranged in a 2×2 configuration is provided for illustration purposes and should not be construed as limiting the scope of the embodiments. For example, a processing block may include 6 processing tiles arranged in 3×2 configuration. It is appreciated that the ML-specific hardware 100 is provided for illustrative purposes and should not be construed as limiting the scope of the embodiments.

Figure 2:
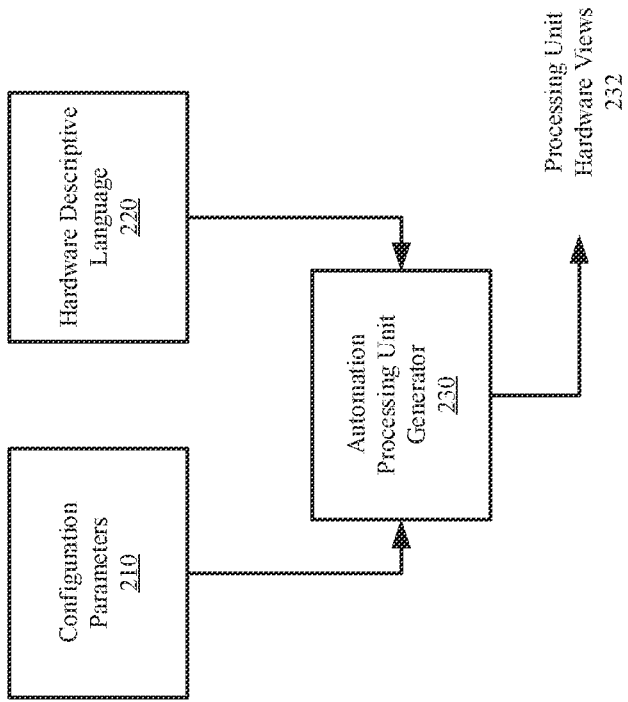
FIG. 2 depicts a system to configure a hardware architecture to scale up/down according to one aspect of the present embodiments.

For illustrative purposes, it is presumed that the architecture of FIG. 1 is to be scaled down. FIG. 2 illustrates a system to configure a hardware architecture to scale up/down according to one aspect of the present embodiments. In FIG. 2, configuration parameters 210 and hardware descriptive language 220 are received by the automation processing unit generator 230 to generate a processing unit hardware view 232.

It is appreciated that the configuration parameters 210 may be data stored in a file in a certain format, e.g., extensible markup language (XML), yet another markup language (YAML), etc. The configuration parameters 210 may be received from a user and may define the configuration of the NPU. As a nonlimiting example, the configuration parameters 210 may define the number of rows for the processing tiles (or the number of rows for processing blocks), the number of columns for processing tiles (or the number of columns for processing blocks), the number of processing tiles, the number of DoDs, the location associated with each DoD, the orientation of each DoD (i.e., location of the DoD connecting to a routing element), OCM size per processing tile in each NPU, etc.

It is appreciated that the hardware descriptive language 220 may be used to describe the structure and behavior of the components. The hardware descriptive language 220 may be a register transfer language (RTL), a Verilog, a very high-speed integrated circuit HDL, etc. It is appreciated that in some embodiments, the hardware descriptive language 220 may include a repository of RTL templates written with templating language syntax, e.g., Mako, Jinja, String, Cheetah, etc., that is embedded in Verilog, VHDL, etc. It is appreciated that a templating language may be used to embed it within a plain text document to emulate other languages. In this nonlimiting example, the hardware descriptive language 220 may be templated RTL with Mako templating that is more compatible with automation processing unit generator 230 that is in Python in one example. It is appreciated that use of RTL templates written with templating language syntax enables updates for new features or changes to be easily updated and for the new schemes to be verified more efficiently.

The automation processing unit generator 230, in this example, is implemented using Python to automatically generate the processing unit hardware views 232 associated with the NPU (e.g., Verilog RTL). The processing unit hardware views 232 is based on the configuration parameters 210 and the hardware descriptive language 220. It is appreciated that describing the embodiments using Python is for illustration purposes only and should not be construed as limiting the scope of the embodiments. For example, other programming languages may be used, e.g., Pearl, C, tool command language (TCL), etc. It is further appreciated that the automation processing unit generator 230 improves scale verification, documentation, etc.

Accordingly, RTL associated with the configuration parameters 210 is automatically generated. As such, the hardware architecture may be scaled up/down as desired in an automated and highly efficient manner. Moreover, it is appreciated that the embodiments, as described above, enables NPUs with different configuration (independent NPUs) to be implemented on the same chip, without requiring manual manipulation, supports multiple DoDs, supports user friendly interface to program RTL, etc.

Figure 3:
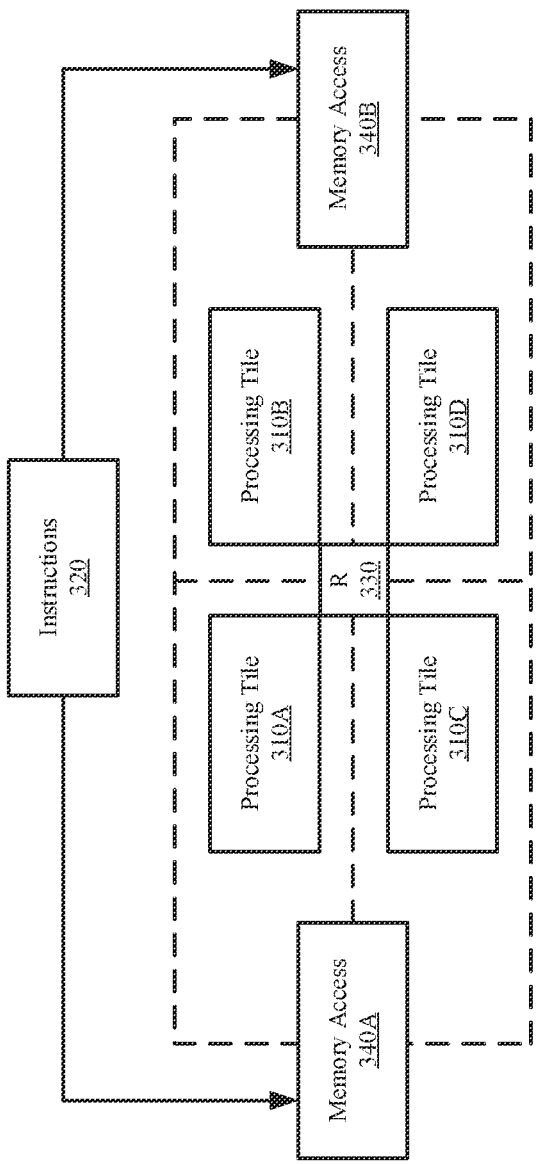
FIGS. 3-7 depict examples of neural processing units (NPUs) generated based on configuration parameters according to one aspect of the present embodiments.

Referring now to FIGS. 3-7, examples of NPUs generated based on configuration parameters according to one aspect of the present embodiments are shown. Referring specifically to FIG. 3, the configuration parameters may indicate that an NPU with 1 row, 1 column, 4 processing tiles, and 2 memory accesses are desired. It is appreciated that the memory access may be a DoD (i.e., DDR to OCM via DMA). The automation processing unit generator 230 receives the configuration parameters, e.g., as a YAML file. Moreover, the automation processing unit generator 230 receives the templated RTL. The automation processing unit generator 230 utilizes the basic processing blocks (e.g., processing tiles connected via a routing element) to generate an NPU. In this example, the processing tiles 310A-310D (similar to those described in FIG. 1) are laid out in a 2×2 configuration according to the configuration parameters. The processing tiles 310A-310D are connected to one another using a routing element 330 similar to routing element R in FIG. 1. In this example, 2 memory accesses 340A-340B are also placed according to the configuration parameters. The memory accesses 340A-340B are DoDs in this example and have been described above. It is appreciated that in some embodiments, the location and/or orientation of the DoD may also be specified (not shown here). The size of the OCM may also be adjusted (not shown here) based on the configuration parameters. It is appreciated that instructions 320 (may be stored in a memory component or come from a core, e.g., a processor) may be routed to the memory accesses 340A-340B, via instruction router (not shown), and subsequently routed by the memory accesses 340A-340B to their respective processing tile and/or OCM. As illustrated, the hardware architecture may be scaled up/down as desired in an automated fashion.

Figure 4:
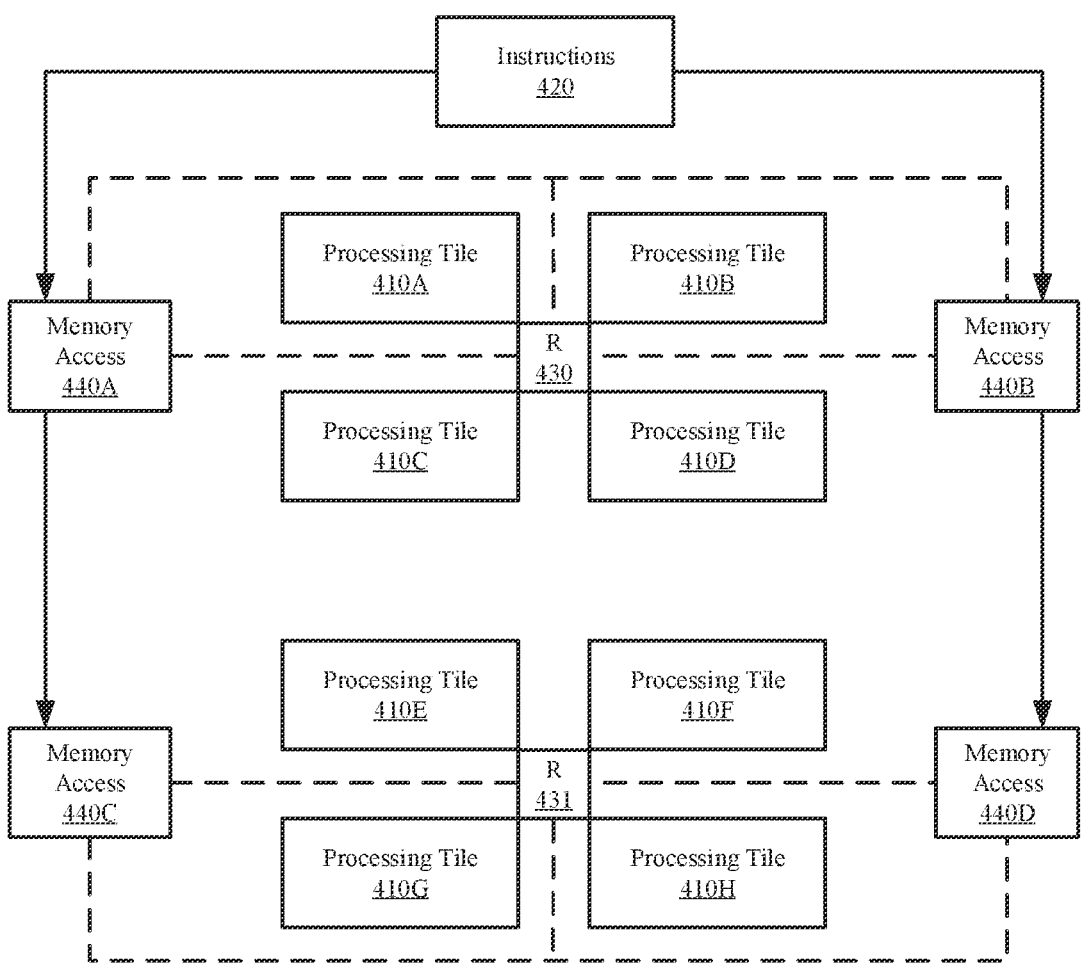

Referring now to FIG. 4, the configuration parameters may indicate that an NPU with 2 rows, 1 column, 8 processing tiles, and 4 memory accesses are desired. It is appreciated that the memory access may be a DoD (i.e., DDR to OCM via DMA). The automation processing unit generator 230 receives the configuration parameters, e.g., as a YAML file. Moreover, the automation processing unit generator 230 receives the templated RTL. The automation processing unit generator 230 utilizes the basic processing blocks (e.g., processing tiles connected via a routing element) to generate an NPU. In this example, the processing tiles 410A-410H (similar to those described in FIG. 1) are laid out in a 2×1 configuration according to the configuration parameters. The processing tiles 410A-410D are connected to one another using a routing element 430 and 410E-410H are connected to one another using a routing element 431 (respectively) similar to routing element R in FIG. 1. In this example, 4 memory accesses 440A-440D are also placed according to the configuration parameters. The memory accesses 440A-440D are DoDs in this example and have been described above. It is appreciated that in some embodiments, the location and/or orientation of the DoD may also be specified (not shown here). The size of the OCM may also be adjusted (not shown here) based on the configuration parameters. It is appreciated that instructions 420 (may be stored in a memory component or come from a core, e.g., a processor) may be routed to the memory accesses 440A-440D, via instruction router (not shown), and subsequently routed by the memory accesses 440A-440D to their respective processing tile and/or OCM. As illustrated, the hardware architecture may be scaled up/down as desired in an automated fashion.

Figure 5:
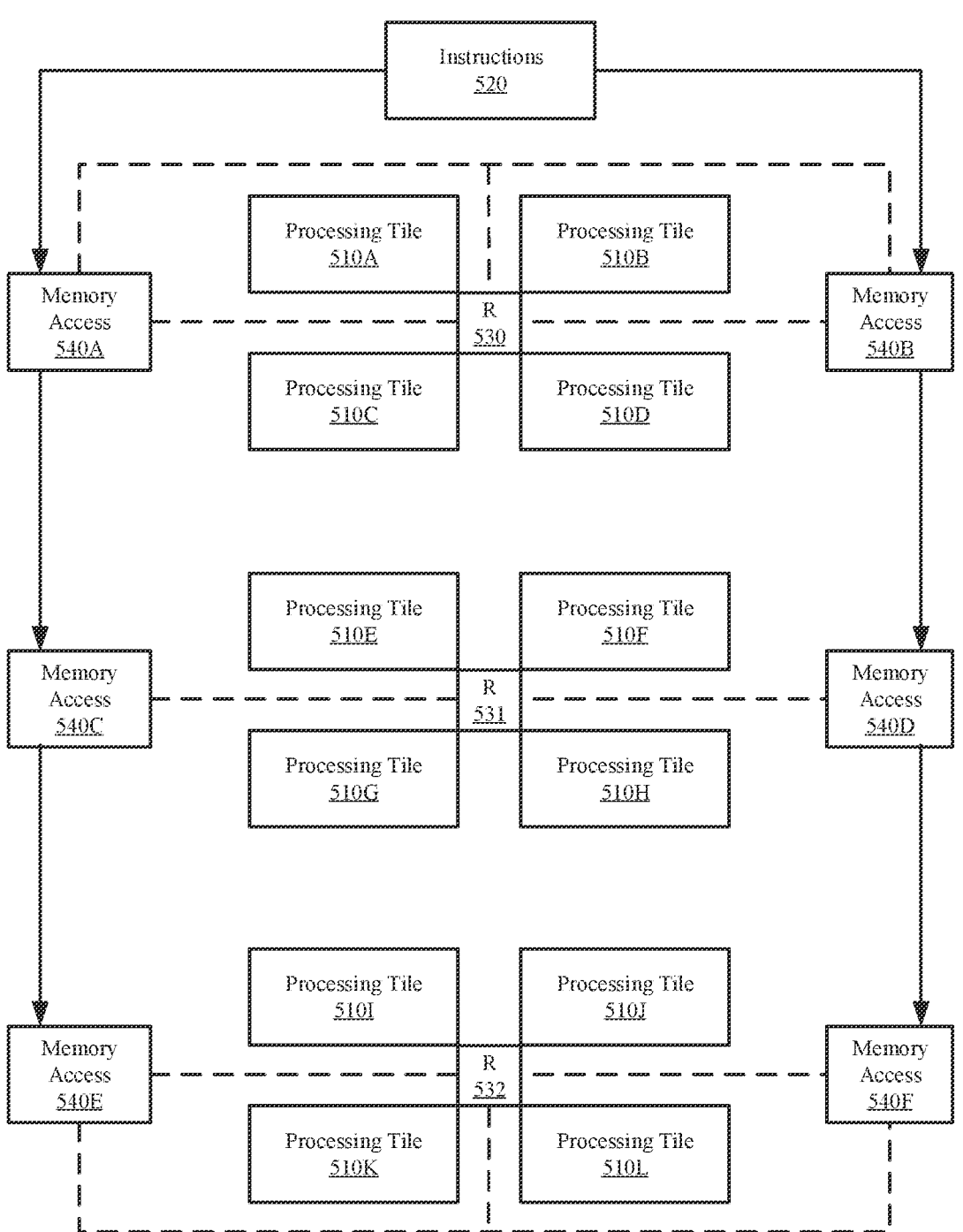

Referring now to FIG. 5, the configuration parameters may indicate that an NPU with 3 rows, 1 column, 12 processing tiles, and 6 memory accesses are desired. It is appreciated that the memory access may be a DoD (i.e., DDR to OCM via DMA). The automation processing unit generator 230 receives the configuration parameters, e.g., as a YAML file. Moreover, the automation processing unit generator 230 receives the templated RTL. The automation processing unit generator 230 utilizes the basic processing blocks (e.g., processing tiles connected via a routing element) to generate an NPU. In this example, the processing tiles 510A-510L (similar to those described in FIG. 1) are laid out in a 3×1 configuration according to the configuration parameters. The processing tiles 510A-510D are connected to one another using a routing element 530, the processing tiles 510E-510H are connected to one another using a routing element 531, and the processing tiles 510I-510L are connected to one another using a routing element 532 similar to routing element R in FIG. 1. In this example, 6 memory accesses 540A-540F are also placed according to the configuration parameters. The memory accesses 540A-540F are DoDs in this example and have been described above. It is appreciated that in some embodiments, the location and/or orientation of the DoD may also be specified (not shown here). The size of the OCM may also be adjusted (not shown here) based on the configuration parameters. It is appreciated that instructions 520 (may be stored in a memory component or come from a core, e.g., a processor) may be routed to the memory accesses 540A-540F, via instruction router (not shown), and subsequently routed by the memory accesses 540A-540F to their respective processing tile and/or OCM. As illustrated, the hardware architecture may be scaled up/down as desired in an automated fashion.

Figure 6:
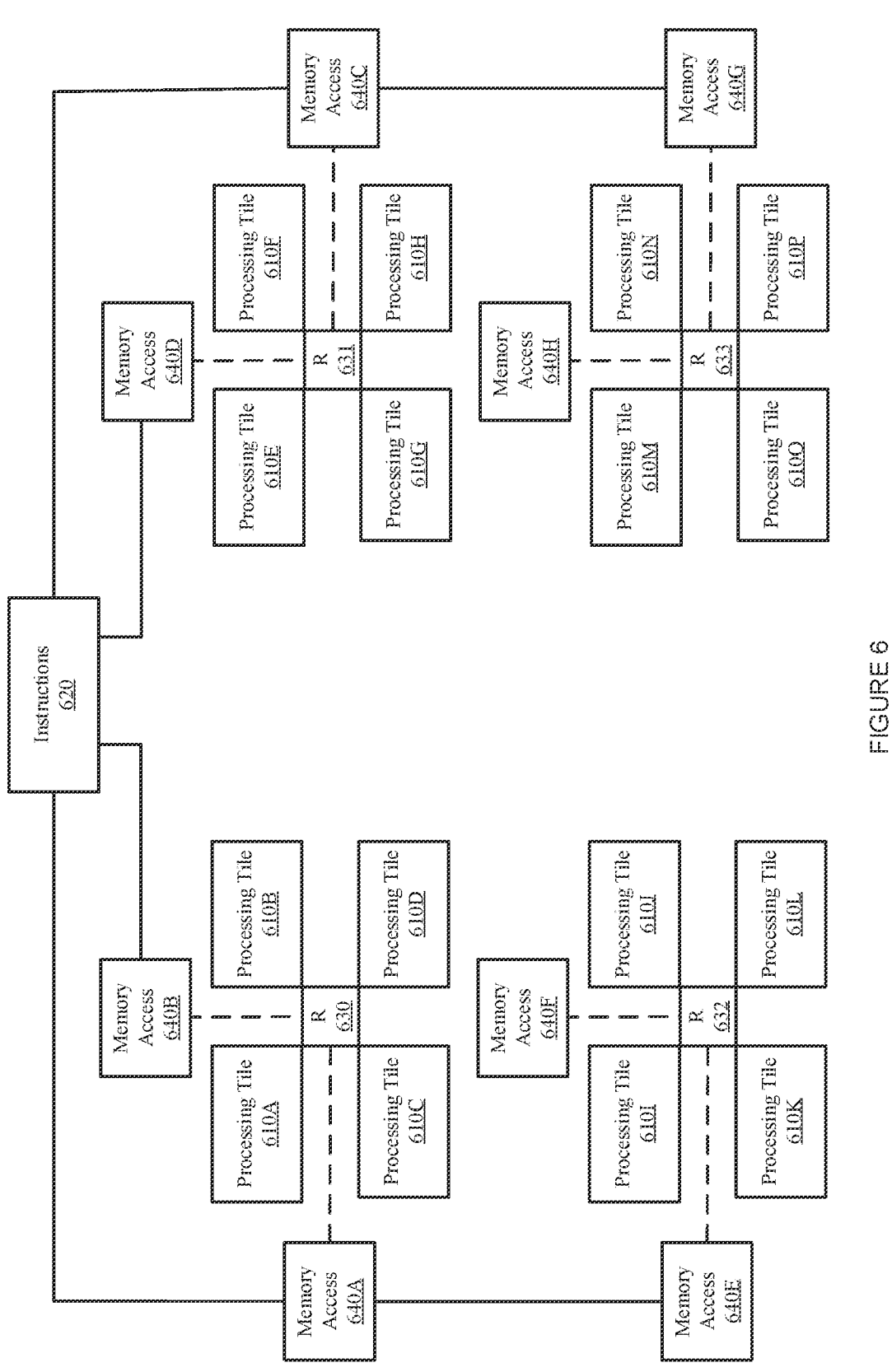

Referring now to FIG. 6, the configuration parameters may indicate that an NPU with 2 rows, 2 columns, 16 processing tiles, and 8 memory accesses are desired. It is appreciated that the memory access may be a DoD (i.e., DDR to OCM via DMA). The automation processing unit generator 230 receives the configuration parameters, e.g., as a YAML file. Moreover, the automation processing unit generator 230 receives the templated RTL. The automation processing unit generator 230 utilizes the basic processing blocks (e.g., processing tiles connected via a routing element) to generate an NPU. In this example, the processing tiles 610A-610P (similar to those described in FIG. 1) are laid out in a 2×2 configuration according to the configuration parameters. The processing tiles 610A-D are connected to one another using a routing element 630, the processing tiles 610E-610H are connected to one another using a routing element 631, the processing tiles 610I-610L are connected to one another using a routing element 632, and the processing tiles 610M-610P are connected to one another using a routing element 633 similar to routing element R in FIG. 1. In this example, 8 memory accesses 640A-640G are also placed according to the configuration parameters. The memory accesses 640A-640G are DoDs in this example and have been described above. It is appreciated that in some embodiments, the location and/or orientation of the DoD may also be specified (not shown here). The size of the OCM may also be adjusted (not shown here) based on the configuration parameters. It is appreciated that instructions 620 (may be stored in a memory component or come from a core, e.g., a processor) may be routed to the memory accesses 640A-640G, via instruction router (not shown), and subsequently routed by the memory accesses 640A-640G to their respective processing tile and/or OCM.

As illustrated above, the hardware architecture may be scaled up/down as desired in an automated fashion. Moreover, it is appreciated that the NPU in FIG. 6 has a different configuration than that of FIG. 3 even though they are both in a 2×2 configuration. In other words, the proposed embodiments enables the NPUs to be designed and configured as desired in an automated fashion based on the basic processing blocks, as described above.

Figure 7:
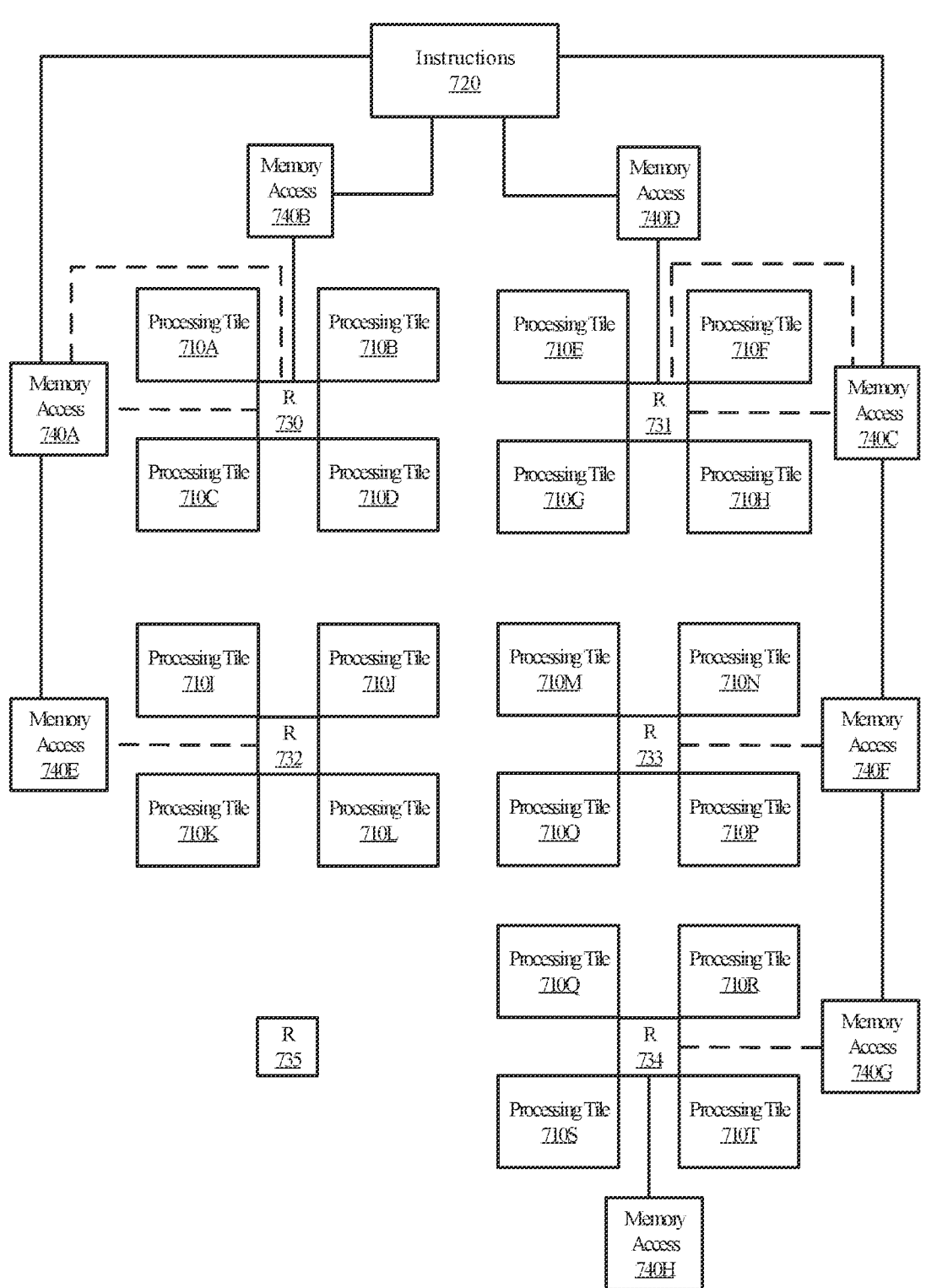

Referring now to FIG. 7, the configuration parameters may indicate that an NPU with 3 rows, 2 columns, 20 processing tiles, and 8 memory accesses are desired. It is appreciated that the memory access may be a DoD (i.e., DDR to OCM via DMA). The automation processing unit generator 230 receives the configuration parameters, e.g., as a YAML file. Moreover, the automation processing unit generator 230 receives the templated RTL. The automation processing unit generator 230 utilizes the basic processing blocks (e.g., processing tiles connected via a routing element) to generate an NPU. In this example, the processing tiles 710A-710T (similar to those described in FIG. 1) are laid out in a 3×2 configuration according to the configuration parameters. The processing tiles 710A-D are connected to one another using a routing element 730, the processing tiles 710E-H are connected to one another using a routing element 731, the processing tiles 710I-L are connected to one another using a routing element 732, the processing tiles 710M-P are connected to one another using a routing element 733, and the processing tiles 710Q-T are connected to one another using a routing element 734 similar to routing element R in FIG. 1. In this example, 8 memory accesses 740A-740G are also placed according to the configuration parameters. The memory accesses 740A-740G are DoDs in this example and have been described above. It is appreciated that in some embodiments, the location and/or orientation of the DoD may also be specified (not shown here). The size of the OCM may also be adjusted (not shown here) based on the configuration parameters. It is appreciated that instructions 720 (may be stored in a memory component or come from a core, e.g., a processor) may be routed to the memory accesses 740A-740G, via instruction router (not shown), and subsequently routed by the memory accesses 740A-740G to their respective processing tile and/or OCM. It is appreciated that additional components may be present. For example, a routing element 735 may be used to provide communication route to/from other routing elements and it may or may not have its own processing tile.

As illustrated, the hardware architecture may be scaled up/down as desired in an automated fashion. In other words, NPUs with different configurations, e.g., different processing tiles, different DoDs, different number of rows and columns, etc., may be generated in an automated fashion. Accordingly, different NPUs may even be placed on the same chip (i.e., system on chip SoC).

FIG. 8 depicts a flowchart of an example of generating an NPU according to one aspect of the present embodiments. At step 810, one or more configuration parameters associated with an NPU is received, as described above in FIGS. 2-7. The one or more configuration parameters defines a number of processing tiles within the NPU, as described above. It is appreciated that a processing tile includes a processing element of a first type configured to perform a dense operation, a processing element of a second type configured to perform a sparse operation, and an OCM associated therewith. The one or more configuration parameters may be received via a file in an XML format or a YAML format. At step 820, the NPU is automatically generated based on the one or more configuration parameters and further based on a HDL. In some embodiments, the HDL may be in RTL format. In one nonlimiting example, the RTL is templated using a templating language, e.g., Mako, Jinja, etc. It is appreciated that the generated NPU may be in RTL format. According to one nonlimiting example, the generation of the NPU may use Python, Pearl, C, or TCL.

It is appreciated that the one or more configuration parameters may define the layout, e.g., number of rows, number of columns, number of DoDs, location and/or orientation of DoDs, etc., associated with the processing tiles. In one nonlimiting example the one or more configuration parameters define a size associated with OCM of the processing tile. According to some embodiments, the minimum number of processing tiles may be 4 and the maximum number of DoDs for a group of 4 processing tiles may be 2.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A method, comprising:

receiving one or more configuration parameters associated with a neural processing unit (NPU), wherein the one or more configuration parameters defines a number of processing tiles within the NPU, and wherein a processing tile includes a processing element of a first type configured to perform a dense operation, a processing element of a second type configured to perform a sparse operation, and an on-chip memory (OCM) associated therewith; and automatically generating the NPU based on the one or more configuration parameters and further based on a hardware descriptive language (HDL), wherein a number of double data rate (DDR) memory to the OCM via direct memory access (DMA) (DoD) is less than a number of the processing tiles arranged in a plurality of rows by a plurality of columns.

2. The method of claim 1, wherein the one or more configuration parameters defines a layout associated with the processing tiles.

3. The method of claim 2, wherein the layout includes a number of rows and a number of columns.

4. The method of claim 1, wherein the one or more configuration parameters defines a number of double data rate (DDR) memory to OCM via direct memory access (DMA) (DoD).

5. The method of claim 4, wherein the one or more configuration parameters defines a location or orientation associated with the DoD.

6. The method of claim 1, wherein the one or more configuration parameters define a size associated with OCM of the processing tile.

7. The method of claim 1, wherein the one or more configuration parameters is received via file in an extensible markup language (XML) format or yet another markup language (YAML) format.

8. The method of claim 1, wherein the HDL is a register transfer language (RTL).

9. The method of claim 8, wherein the RTL is templated using a templating language.

10. The method of claim 9, wherein the templating language is a Mako or Jinja.

11. The method of claim 1, wherein the generated NPU is in register transfer language (RTL) format.

12. The method of claim 1, wherein one of Python, Pearl, C, or tool command language (TCL) is used to automatically generate the NPU.

13. The method of claim 1, wherein the number of processing tiles is at least four.

14. The method of claim 13, wherein a maximum number of double data rate (DDR) memory to OCM via direct memory access (DMA) (DoD) is less than or equal to two for every four processing tiles arranged in a two by two rows and columns.

15. A method, comprising:

receiving a file comprising one or more configuration parameters associated with a neural processing unit (NPU), wherein the one or more configuration parameters defines a layout associated with a plurality of processing tiles within the NPU, and wherein each processing tile within the plurality of processing tiles includes a processing element of a first type configured to perform a dense operation, a processing element of a second type configured to perform a sparse operation, and an on-chip memory (OCM) associated therewith; and automatically generating the NPU based on the one or more configuration parameters and further based on a register transfer language (RTL), wherein a number of double data rate (DDR) memory to the OCM via direct memory access (DMA) (DoD) is less than a number of the processing tiles arranged in a plurality of rows by a plurality of columns.

16. The method of claim 15, wherein the layout includes one or more of a number of rows and a number of columns associated with the plurality of processing tiles and a number of double data rate (DDR) memory to OCM via direct memory access (DMA) (DoD).

17. The method of claim 16, wherein the layout further includes a location or orientation associated with the DoD.

18. The method of claim 15, wherein the layout further includes a size associated with OCM of a processing tile within the plurality of processing tiles.

19. The method of claim 15, wherein the file is in an extensible markup language (XML) format or yet another markup language (YAML) format.

20. The method of claim 15, wherein the RTL is templated using a templating language that includes a Mako or a Jinja.

21. The method of claim 15, wherein the generated NPU is in RTL format.

22. The method of claim 15, wherein one of Python, Pearl, C, or tool command language (TCL) is used to automatically generate the NPU.

23. A system comprising:

a means for receiving a file comprising one or more configuration parameters associated with a neural processing unit (NPU), wherein the one or more configuration parameters defines a layout associated with a plurality of processing tiles within the NPU, and wherein each processing tile within the plurality of processing tiles includes a processing element of a first type configured to perform a dense operation, a processing element of a second type configured to perform a sparse operation, and an on-chip memory (OCM) associated therewith; and a means for automatically generating the NPU based on the one or more configuration parameters and further based on a register transfer language (RTL), wherein a number of double data rate (DDR) memory to the OCM via direct memory access (DMA) (DoD) is less than a number of the processing tiles arranged in a plurality of rows by a plurality of columns.

* * * * *